Patented Apr. 22, 1952

2,593,613

UNITED STATES PATENT OFFICE 2,593,613

CONDENSATES OF ROSIN WITH CARBOCYCLIC UNSATURATED HYDROCARBONS

Alfred L. Rummelsburg, Wilmington, Del., assignor to Hercules Powder Company, Wilmington, Del., a corporation of Delaware No Drawing. Application December 23, 1949, Serial No. 134,844

15 Claims. (Cl. 106—227)

1

This invention relates to resinous condensation products of rosin with unsaturated carbocyclic hydrocarbons having at least two centers of unsaturation and to esters of said condensation products and to varnish compositions containing the same.

Rosin has long been known to be deficient alone or in the form of its esters for use in varnishes, particularly because of its softness and poor bodying characteristics. Polymerization of rosin has been one means practiced by the art to overcome such deficiencies. By polymerization of rosin some improvement has been obtained but products which would be entirely satisfactory from the standpoint of bodying and drying characteristics have not been produced by polymerization alone.

Now in accordance with this invention, it has been found that rosin may be condensed in the presence of an acid-acting condensation catalyst with an unsaturated carbocyclic hydrocarbon having at least two centers of unsaturation to form a novel resinous condensation product which may be esterified, the condensation product more particularly in the form of the esters thereof exhibiting the desired improvement in bodying, drying, and flexibility characteristics when used in varnishes and other coating compositions.

More particularly, the condensation products of rosin with unsaturated carbocyclic hydrocarbons of this invention are resinous products obtained by condensing in the presence of an acid-acting rosin polymerization catalyst a rosin with an unsaturated carbocyclic hydrocarbon which has at least two centers of unsaturation and which is capable of self-polymerization to a hemicolloid at temperatures within the range of about —20° C. to about 150° C. depending upon the particular materials being condensed and other factors.

2

The conditions for effecting the condensation of rosin with the unsaturated carbocyclic hydrocarbons are more specifically set forth in the following examples. Unless otherwise noted all weights are parts by weight.

EXAMPLE 1

To a solution of 500 parts inhibitor-free divinylbenzene and 1504 parts wood rosin dissolved in 2256 parts benzene was added boron trifluoride gas over a period of 25 minutes with stirring while maintaining the temperature at about 17–25° C. with external cooling until 15 parts boron trifluoride was absorbed. The solution thus prepared was then allowed to stand for 4 hours at a temperature of about 17–25° C. The solution was then poured into an equal volume of water and washed with warm water (50–60° C.) to remove the catalyst. About 250 parts xylene was added to reduce the viscosity during the distillation to remove benzene, and both benzene and the last of the xylene were removed by heating up to about 200° C. at 15–25 mm. pressure. The rosin condensate thus freed of solvent amounted to 1992 parts by weight and had the following analysis: acid number 116, drop melting point 165.5° C., unsaponifiable content 3.8%. From the weight of the condensate, it is calculated that the rosin-divinylbenzene condensate contains about 0.9 mole of divinylbenzene per mole of rosin.

Examples 2 to 6 were carried out in a similar manner. The data on the condensation and characteristics of the rosin condensates are set forth in Table I. The rosins used were pale wood rosins. The divinylbenzene used in the examples was a commercial product containing in one instance 40% divinylbenzene and in another 50% divinylbenzene. In addition, ethyl vinylbenzene was also present and the results indicate that it also entered into the condensation.

Table I

| Example | Reactants | | | | Reaction Conditions | | | | | Products | | | | |
|---|---|---|---|---|---|---|---|---|---|---|---|---|---|---|
| | Carbocyclic Hydrocarbon | Weight Carbocyclic Hydrocarbon | Weight Rosin | Catalyst | Weight Catalyst | Solvent | Weight Solvent | Time (Minutes) | Temperature, °C. | Weight | Acid Number | Drop Melting Point, °C. | Unsaponifiable Content (Per Cent) | Molecular Weight |
| 1 | Divinylbenzene (40%) | 500 | 1,504 | BF₃ | 15 | Benzene | 2,256 | 240 | 20–25 | 1,992 | 116 | 165.5 | 3.8 | |
| 2 | Divinylbenzene (40%) | 40 | 860 | BF₃ | 18 | ...do | 1,290 | 240 | 25–30 | 967 | 133 | 145 | | |
| 3 | Divinylbenzene (50%) | 30 | 200 | ZnCl₂ | 6 | Naphtha | 100 | 240 | 130 | 228 | 135.5 | 131 | 6.9 | |
| 4 | Divinylbenzene (50%) | 44 | 240 | H₂SO₄ | 50 | Benzene | 360 | 60 | 20–29 | 285 | 126 | 136 | 6.1 | |
| 5 | Diisopropenylbenzene | 31 | 137 | BF₃ | 4 | ...do | 219 | 90 | 25–30 | 166 | 128 | 129 | 6.3 | |
| 6 | Cyclopentadiene | 112 | 600 | BF₃ | 12 | ...do | 900 | 240 | 20–25 | 710 | 134 | 129 | 4.8 | |

The rosins which are used are those having ethylenic unsaturation, such as the natural rosins of the type of wood and gum rosin, and treated rosins such as heat-bleached, heat-treated, and isomerized rosins.

The unsaturated carbocyclic hydrocarbons used are those which have at least two centers of unsaturation and which are capable of self-polymerization to hemicolloids, i. e., to polymers having at least 20 to 100 units per polymer molecule. Carbocyclic compounds of this type and suitable for use in this invention include divinylbenzene diisopropenylbenzene, and cyclopentadiene. These are all monomeric compounds. Mixtures of any of these compounds may be used. The molecular ratio of rosin to unsaturated carbocyclic hydrocarbon in the condensation may vary from about 0.1 to 20. Any unreacted monomeric unsaturated carbocyclic hydrocarbon remaining may be removed from the condensation product as, for example, by distillation.

As a catalyst, any of the well-known acid-acting condensation catalysts may be used, such as the Friedel-Crafts type catalysts including boron trifluoride, complexes of boron trifluoride with ethers and organic acids, halides of metals whose hydroxides are amphoteric, such as aluminum chloride, zinc chloride, stannic chloride, titanium tetrachloride, etc., and mineral acid condensation catalysts, such as hydrofluoric acid, fluoboric acid, sulfuric acid, and phosphoric acid. These catalysts are generally known as acid-acting condensation catalysts and are all effective catalysts for the polymerization of rosin or rosin acids inter sese. The Friedel-Crafts type catalysts are preferred. Since peroxide-type catalysts promote self-polymerization of the unsaturated carbocyclic hydrocarbons rather than condensation with the rosin and produce mixtures of rosin and polymer which have a high unsaponifiable content and lower melting point, the condensation is preferably carried out in the absence of peroxides or peroxidic materials.

In carrying out the condensation, a temperature range varying from as low as −20° C. to as high as 150° C. may be used. Ordinarily temperatures from about 0° C. to about 60° C. are preferred with boron trifluoride catalysts while with zinc chloride the preferred temperature range is 100° C. to 140° C.

Inert solvents may be used to improve the fluidity of the reactants and to facilitate dispersion of the catalyst. Satisfactory solvents are aromatic solvents such as benzene, xylene, and the like; hydrocarbon solvents such as cyclohexane and benzene hydrocarbons, and halogenated solvents such as carbon tetrachloride and ethylene dichloride.

The rosin condensates of this invention are stabilized resinous materials having decreased tendency to absorb oxygen. Moreover, they are generally higher melting than rosin and are considered to be true carbon-to-carbon condensates as indicated by their high acid number and low unsaponifiable contents. The preferred products of this invention have an unsaponifiable content not substantially greater but have melting points substantially higher than those of the rosins from which they are made. They are characterized by solubility in aromatic, paraffinic, and olefinic hydrocarbon solvents, turpentine, and drying oils. Their solubility in the lower alcohols is in general low, but increases as the molecular weight of the alcohol is increased.

If the rosin condensates of this invention are to be used in varnishes with drying oils, phenolic inhibitors should not be present and the inhibitors normally used to prevent polymerization of the unsaturated hydrocarbons should, therefore, be removed before use. The inhibitors are more difficult to remove after the condensation if not removed before.

The condensation products of rosin with unsaturated carbocyclic hydrocarbons having more than one center of unsaturation in the molecule appear to contain polybasic acids wherein more than one resin acid nucleus has been condensed with the polyunsaturated carbocyclic hydrocarbon. Moreover, the condensate appears to be a mixture of monocarboxylic acids and polycarboxylic acids, depending upon the conditions used in effecting the condensation. An example of a condensation rich in dibasic acids and the conditions for its preparation are set forth in Table I, Example 1. The preferred condensates of this invention are those having an average molecular weight between about 350 and 1000. The condensation products containing various ratios of resin acid to carbocyclic hydrocarbon are prepared by varying the amount of unsaturated carbocyclic hydrocarbon added in the condensation and by controlling the rate of condensation.

The esters of the condensation products of rosin with unsaturated carbocyclic hydrocarbons may be prepared by heating with the desired alcohol at temperatures within the range of about 200° C. to about 350° C. with or without catalysts such as zinc and calcium salts. A characteristic of the condensates of this invention is their tendency to form gelled esters with polyhydric alcohols and to form esters capable of heat-setting by virtue of their polyfunctionality.

The method of preparing the esters of the condensation products of rosin with unsaturated carbocyclic hydrocarbons of this invention and the properties of the esters so produced are illustrated by the examples of Table II.

Table II

| Ester and Varnish No. | Condensate | Ester Preparation | | | | | | | | | | Varnish Preparation | | | |
|---|---|---|---|---|---|---|---|---|---|---|---|---|---|---|---|
| | | Example of Table I | Wt. Calcium Acetate | Wt. Condensate | Wt. Glycerin | Wt. Pentaerythritol | Wt. Linseed Oil Fatty Acids | Time (Hrs.) | Temperature, °C. | Acid Number | Drop Melting Point, °C. | Wt. Ester | Z3 Linseed Oil | Z2 Dehydrated Castor Oil | Bodying Time (Mins.) 585° F. |
| 1 | Divinylbenzene-Rosin. | 1 | ------ | 234 | 61 | ------ | 345 | 8 | 220–270 | 7.5 | ------ | ------ | ------ | ------ | ------ |
| 2 | ----do---- | 2 | ------ | 400 | 54.7 | ------ | ------ | 20 | 200–270 | 10.5 | 165 | 230 | 184 | 184 | 60 |
| 3 | ----do---- | 2 | 1.1 | 400 | ------ | 37.5 | ------ | 7 | 280–295 | 22.5 | 176 | ------ | ------ | ------ | ------ |
| 4 | Cyclopentadiene-Rosin. | 6 | ------ | 600 | 55.2 | ------ | ------ | 13 | 200–270 | ------ | 151 | 230 | 184 | 184 | 60 |

The alcohols which may be used to esterify the condensation products of rosin with the unsaturated carbocyclic hydrocarbons are the monohydric alcohols such as methyl alcohol, ethyl alcohol, propyl alcohol, tetrahydrofuryl carbinol, furyl carbinol, benzyl alcohol, crotyl alcohol, etc., and the polyhydric alcohols such as glycol, glycerin, pentaerythritol, dipentaerythritol, sorbitol, mannitol, propylene glycol, polyethylene glycols, trimethylene glycol, and diglycerol. The polyhydric alcohol esters are hard resinous materials having decreased tendency to absorb oxygen and having in general melting points higher than the corresponding rosin esters. Mixed esters of the condensation products may be produced by esterification in admixture with other ester-forming materials as drying oil fatty acids or products of alcohlysis of drying oils with polyhydric alcohols.

Varnishes may be produced from the condensation products of this invention or their esters by customary varnish-making technique with use of any of the well-known drying oils such as linseed oil, tung oil, dehydrated castor oil, soya oil, fish oil, sunflower seed oil, rape seed oil, perilla oil, oiticica oil, hemp seed oil, and dissolving in a solvent. Driers are preferably added. A varnish prepared from the ester of a condensation product of a rosin with an unsaturated carbocyclic hydrocarbon of this invention may be carried out as follows: 230 parts glycerin ester of a divinylbenzene-rosin condensation product (ester No. 2, Table II) was dissolved in 184 parts Z3 (Gardner-Holdt viscosity) linseed oil and 184 parts Z2 dehydrated castor oil and heated rapidly to 585° F. at which temperature the cooking was continued for 60 minutes. This varnish cook was then diluted with mineral spirits to a concentration of 50%, and 0.5% lead and 0.07% cobalt were added as naphthenates. This varnish as well as those whose preparation is set forth in Table II showed fast drying characteristics together with excellent flexibility and excellent water and alkali resistance. Instead of mineral spirits, other volatile hydrocarbon solvents such as turpentine, monocyclic terpenes, cymene, cumene, and toluene may be used. The preferred varnishes of this invention will contain drying oil in an amount not greater than about four times the weight of the resinuous material of this invention.

The compositions of this invention can thus be made into oleoresinous varnishes having bodying characteristics and drying characteristics superior to those prepared from rosin or polymerized rosin and whose varnish films have greater water resistance, flexibility, and stability toward oxidation.

Subject matter common to the instant application is to be found in applicant's copending application Serial No. 68,755 filed December 31, 1948, and now abandoned. This application is a continuation-in-part of copending application Serial No. 671,392 filed May 21, 1946, now U. S. Patent No. 2,532,120, and of copending application Serial No. 760,492 filed July 11, 1947, now U. S. Patent No. 2,527,578.

What I claim and desire to protect by Letters Patent is:

1. A new composition of matter comprising a resinous material selected from the group consisting of a carbon-carbon condensation product of a rosin with an unsaturated carbocyclic hydrocarbon having at least two centers of unsaturation and being capable of self-polymerization to a hemicolloid and esters of said condensation product, the molar ratio of rosin to carbocyclic hydrocarbon in the condensation product being from about 0.1 to 20, said carbon-carbon condensation product being the product of condensation of the reactants in the presence of an acid-acting condensation catalyst at a temperature within the range of about —20° C. to about 150° C.

2. A new composition of matter comprising a resinous material selected from the group consisting of a carbon-carbon condensation product of a rosin with diisopropenylbenzene and esters of said condensation product, the molar ratio of rosin to diisopropenylbenzene in the condensation product being from about 0.1 to 20, said carbon-carbon condensation product being the product of condensation of the reactants in the presence of an acid-acting condensation catalyst at a temperature within the range of about —20° C. to about 150° C.

3. A new composition of matter comprising a resinous material selected from the group consisting of a carbon-carbon condensation product of a rosin with cyclopentadiene and esters of said condensation product, the molar ratio of rosin to cyclopentadiene in the condensation product being from about 0.1 to 20, said carbon-carbon condensation product being the product of condensation of the reactants in the presence of an acid-acting condensation catalyst at a temperature within the range of about —20° C. to about 150° C.

4. A new composition of matter comprising a resinous material selected from the group consisting of a carbon-carbon condensation product of a rosin with divinylbenzene and esters of said condensation product, the molar ratio of rosin to divinylbenzene in the condensation product being from about 0.1 to 20, said carbon-carbon condensation product being the product of condensation of the reactants in the presence of an acid-acting condensation catalyst at a temperature within the range of about —20° C. to about 150° C.

5. A new composition of matter comprising a resinous ester of a polyhydric alcohol and a carbon-carbon condensation product of a rosin with diisopropenylbenzene, the molar ratio of rosin to diisopropenylbenzene in the condensation product being from about 0.1 to 20, said carbon-carbon condensation product being the product of condensation of the reactants in the presence of an acid-acting condensation catalyst at a temperature within the range of about —20° C. to about 150° C.

6. A new composition of matter comprising a resinous ester of a polyhydric alcohol and a carbon-carbon condensation product of a rosin with cyclopentadiene, the molar ratio of rosin to cyclopentadiene in the condensation product being from about 0.1 to 20, said carbon-carbon condensation product being the product of condensation of the reactants in the presence of an acid-acting condensation catalyst at a temperature within the range of about —20° C. to about 150° C.

7. A new composition of matter comprising a resinous ester of a polyhydric alcohol and a carbon-carbon condensation product of a rosin with divinylbenzene, the molar ratio of rosin to divinylbenzene in the condensation product being from about 0.1 to 20, said carbon-carbon condensation product being the product of condensation of the reactants in the presence of an acid-acting condensation catalyst at a temperature within the range of about —20° C. to about 150° C.

8. The method of producing a stabilized resinous material which comprises condensing one molar portion rosin with 0.1 to 20 molar portions unsaturated carbocyclic hydrocarbon having at least two centers of unsaturation and being capable of self-polymerization to a hemicolloid, at a temperature within the range of about —20° C. to about 150° C. in the presence of an acid-acting condensation catalyst.

9. The method of producing a stabilized resinous material which comprises condensing rosin with an unsaturated carbocyclic hydrocarbon of the group consisting of cyclopentadiene, diisopropenylbenzene, and divinylbenzene in the presence of an acid-acting condensation catalyst, at a temperature within the range of about —20° C. to about 150° C.

10. The method of producing a stabilized resinous material which comprises condensing one molar portion rosin with 0.1 to 20 molar portions divinylbenzene at a temperature within the range of about —20° C. to about 150° C. in the presence of an acid-acting condensation catalyst.

11. The method of producing a stabilized resinous material which comprises condensing rosin with divinylbenzene at a temperature within the range of about 0° C. and 60° C. in the presence of boron trifluoride.

12. A coating composition comprising a resinous material selected from the group consisting of a carbon-carbon condensation product of a rosin with an unsaturated carbocyclic hydrocarbon having at least two centers of unsaturation and being capable of self-polymerization to a hemicolloid, and polyhydric alcohol esters of said condensation product, the molar ratio of rosin to carbocyclic hydrocarbon in the condensation product being from about 0.1 to 20, said carbon-carbon condensation product being the product of condensation of the reactants in the presence of an acid-acting condensation catalyst at a temperature within the range of about —20° C. to about 150° C; and a volatile hydrocarbon solvent in an amount sufficient to yield a readily-flowing mixture capable of application in a thin film.

13. A coating composition comprising a resinous material selected from the group consisting of a carbon-carbon condensation product of a rosin with an unsaturated carbocyclic hydrocarbon having at least two centers of unsaturation and being capable of self-polymerization to a hemicolloid, and polyhydric alcohol esters of said condensation product, the molar ratio of rosin to carbocyclic hydrocarbon in the condensation product being from about 0.1 to 20, said carbon-carbon condensation product being the product of condensation of the reactants in the presence of an acid-acting condensation catalyst at a temperature within the range of about —20° C. to about 150° C.; a drying oil; and a volatile hydrocarbon solvent in an amount sufficient to yield a readily-flowing mixture capable of application in a thin film.

14. As a new composition of matter, the carbon-carbon condensation product of cyclopentadiene and a rosin, said carbon-carbon condensation product being the product of condensation of the reactants in the presence of an acid-acting condensation catalyst at a temperature within the range of about —20° C. to about 150° C.

15. As a new composition of matter a polyhydric alcohol ester of the carbon-carbon condensation product of cyclopentadiene and a rosin, said carbon-carbon condensation product being the product of condensation of the reactants in the presence of an acid-acting condensation catalyst at a temperature within the range of about —20° C. to about 150° C.

ALFRED L. RUMMELSBURG.

REFERENCES CITED

The following references are of record in the file of this patent:

UNITED STATES PATENTS

| Number | Name | Date |
|---|---|---|
| 2,468,770 | Morris | May 3, 1949 |